Patented June 3, 1941

2,244,020

UNITED STATES PATENT OFFICE 2,244,020

LIQUID DISPERSION OF CARBON BLACK AND VINYL RESINS

Carl William Patton, Pittsburgh, Pa., assignor to Carbide and Carbon Chemicals Corporation, a corporation of New York No Drawing. Application March 23, 1938, Serial No. 197,585

3 Claims. (Cl. 260—41)

This invention pertains to dispersions of carbon black pigment in lacquers containing vinyl resins. More specifically, it relates to a method of obtaining permanent dispersions of carbon black pigment in lacquers containing such vinyl resins as result from the conjoint polymerization of vinyl halides with vinyl esters of aliphatic acids.

The first step in a method commonly used to disperse pigments in lacquers containing vinyl resins is to grind a mixture of the resin, pigment, and plasticizer on a differential roll mill until the ingredients are fluxed. The sheet material which results is then broken up and dispersed in a suitable solvent to form a lacquer. In attempts to disperse carbon black pigments in like manner, it has been found that the pigment particles begin to agglomerate immediately after formation of the lacquer, and that this undesirable effect is accentuated materially on storage. The agglomerated particles of the pigment cause a lack of gloss as well as a poor depth of finish in the resulting lacquer coating. The principal object of my invention is to provide a method for dispersing carbon black in lacquers containing vinyl resins so that pigment agglomeration will not occur.

According to one aspect of my invention, ammonia or substituted ammonia compounds are incorporated with the carbon black prior to the initial fluxing of the vinyl resin composition with the carbon black. Basic organic compounds containing metals may also be used in conjunction with the ammonia and ammonia derivatives. This treatment effectively prevents agglomeration of the pigment particles in the lacquer formed. This fact was ascertained by periodic casting and examination of films from the same samples of lacquers made according to this invention. No appreciable change in the gloss, smoothness, or depth of finish was noted. This observation was confirmed by periodic microscopic examination of the carbon black pigment dispersed in the lacquers themselves. No substantial evidence of growth in particle size or agglomeration could be detected.

Preferably, I employ ammonia as the stabilizing agent incorporated with the carbon black pigment. The amino-type compounds are equally useful for the prevention of pigment agglomeration, but lacquer coatings which contain such amine stabilizers tend to have reduced resistance to humidity. The ammonia may be incorporated with the carbon black by exposing the pigment for several minutes to the vapors of anhydrous ammonia. This treatment is entirely satisfactory for the inhibition of pigment agglomeration but it involves a somewhat unwieldy manipulation. A more adaptable method of incorporating the ammonia is to wet the carbon black or a mixture of resin, plasticizer and carbon black with a solution of ammonia in some volatile anhydrous liquid which is a non-solvent for the resin. Suitable liquids include such non-solvents for the resin as the lower aliphatic alcohols and the petroleum naphthas. Methanol is particularly desirable. The resulting composition may then be ground on a roll mill at a temperature preferably about 70° C. and for a length of time preferably not exceeding about 10 minutes. The resulting sheet stock is dispersed in a suitable solvent to form a lacquer. The solvent may contain other material either in solution or dispersion.

The amount of methanol or other inert liquid used should be sufficient to wet the mixture. So far as is known at present, the concentration of ammonia in the inert liquid is not critical, but a high concentration is not required and should preferably be avoided. When the ammoniacal solution contains a large quantity of ammonia and is added just prior to grinding the composition on the roll mill, there is a slight tendency for the resulting lacquer to set into a thixotropic state. However, the pigment particles do not agglomerate. The optimum concentration of ammonia in methanol, for example, to prevent any slight gelation of the lacquer is about 0.3 to about 0.5 normal. If the ammonia solution is added considerably prior to the grinding operation, it has been observed that higher concentrations of ammonia may be employed without an appreciable tendency for gelation to occur in the stabilized lacquer.

While I do not wish to be limited by any theory presented, it is possible that the ammonia is occluded and permanently contained in the carbon black. Probably a substantial part of the ammonia is not volatilized during the milling operation, although the volatile liquid apparently is almost completely removed thereby. The occluded ammonia may serve to charge the pigment particles electrically so that they are mutually repelled. Also, any acidity formed in the resin during the milling operation would be counteracted. Since not all basic substances are suitable to prevent pigment agglomeration, it seems unlikely that acidity is the major cause of pigment agglomeration. Whatever the mechanism may be, treatment of the carbon black with ammonia and its substitution products is eminently successful in preventing agglomeration in liquid dispersions of carbon black and vinyl resins.

I have also found that a vinyl resin composition containing a carbon black pigment may be fluxed on a roll mill and dispersed in a suitable solvent in which the ammonia has been dissolved. This procedure is equally effective in preventing pigment agglomeration in the lacquer. In fact, this invention is not limited to any particular manner of combining the ammonia or ammonia derivatives with the carbon black.

The resin used in the preferred embodiment of this invention is that which may result from the conjoint polymerization of vinyl chloride with vinyl acetate containing from about 70% to about 90% by weight of vinyl chloride. It may have an estimated average molecular weight of from about 5,000 to about 20,000. (The molecular weights are estimated from the specific viscosity of dilute solutions according to Staudinger's method.)

Although the following examples illustrate my invention as applied to a particular vinyl resin, it is understood that other vinyl resins may be employed:

Example 1

A sample of carbon black pigment was exposed to the vapors of anhydrous ammonia for several minutes by diffusing the ammonia through the carbon black in a closed container. A mixture of the following composition was then prepared:

| | Parts by weight |
|---|---|
| Ammonia treated carbon black | 20 |
| Vinyl resin | 68 |
| Di(beta-butoxy ethyl)phthalate | 9.6 |
| Blown castor oil | 2.4 |

The resin used was that resulting from the conjoint polymerization of vinyl chloride with vinyl acetate and contained about 85% to about 88% by weight of vinyl chloride. It had an average estimated molecular weight of about 11,000.

This composition was ground for 10 minutes at a temperature of 80° to 110° C. on a differential speed, 2-roll mill. The resulting stiff resinous composition was broken up and dispersed in methyl isobutyl ketone in the proportions of 340 parts by weight of the solvent to each 100 parts by weight of the above resinous composition. Other suitable solvents includes methyl ethyl ketone, methyl n-amyl ketone, methyl cyclohexanone, and acetonyl acetone, although for most purposes I preferably employ the above-mentioned methyl isobutyl ketone.

Agglomeration of the pigment in the lacquer formed has been effectively prevented for the duration of the test period which, to date, has amounted to several months. Coatings formed from this stabilized dispersion possessed good resistance to humidity.

Example 2

A resinous composition of the following proportions was prepared:

| | Parts by weight |
|---|---|
| Carbon black pigment | 20 |
| Vinyl resin | 65 |
| Plasticizer | 15 |

The vinyl resin was the same as that described in Example 1. The plasticizers examined included: di(beta-butoxy ethyl)phthalate, tricresyl phosphate, diamyl phthalate, and a mixture of 80 parts by weight of di(beta-butoxy ethyl)-phthalate and 20 parts of blown castor oil.

The composition was thoroughly wetted with a nearly saturated solution of ammonia in anhydrous methanol. The amount of ammoniacal solution used was sufficient to form a stiff paste. The mixture was intimately fluxed by grinding on a 2-roll mill for 5 to 10 minutes at a temperature of about 80° C. The resulting sheet was broken up and dispersed in methyl isobutyl ketone to form a lacquer having a ratio of 16 parts of resin to 75 parts of solvent.

The carbon black was uniformly dispersed in the lacquer and no agglomeration occurred on storage. In this instance, there was no tendency for the lacquer to become thixotropic in spite of the high concentration of ammonia in the methanol solution used. The resistance to humidity of the coatings made from this lacquer was somewhat superior to that of the coatings made from the lacquer described in Example 1.

Example 3

The stabilization of the pigment dispersion was somewhat improved for specialized uses by the addition of basic metallic materials to the composition. These include as examples: metallic lead powder, basic lead phenolate, lead phthalate, triphenyl tin hydroxide, and lead naphthenate. The composition of these mixtures was as follows:

| | Parts by weight |
|---|---|
| Carbon black pigment | 20 |
| Vinyl resin | 62 |
| Metallic material | 3 |
| Diamyl phthalate | 15 |

The vinyl resin used was that described in Example 1.

These mixtures were wetted with a methanol solution of ammonia, were ground on a 2-roll mill and were dispersed in a solvent, all exactly as described in Example 2. An exception to this procedure was made in the case of lead naphthenate, which being soluble, was added to the solvent when the balance of the composition was being dispersed.

Example 4

Amino-type organic compounds as a class effectively inhibit pigment agglomeration of carbon black in lacquers. This type of stabilizer should be used only when a high degree of resistance to water and humidity is not required in the finished coating. Examples of suitable amino-type compounds are: N-diethyl amino ethanol, ethylene diamine, triethylamine, monoisopropanolamine, dioctylamine, triethanolamine, triethylene tetramine, acetamide, acetoxime, isopropyl amine, aniline, n-amyl amine, formamide, diphenyl amine, tribenzyl amine, dibenzyl amine, morpholine, monoethanolamine, and dioctyl benzyl amine.

The composition of the stocks containng this type of stabilizer was as follows:

| | Parts by weight |
|---|---|
| Carbon black pigment | 20 |
| Vinyl resin | 64 |
| Amino-type compound | 1 |
| Diamyl phthalate | 15 |

The vinyl resin was that described in Example 1.

The composition was fluxed by milling on a roll mill for 5 to 10 minutes at a temperature of about 80° C. The resulting sheet was broken up and dispersed in methyl isobutyl ketone to form a lacquer in which the ratio of resin to solvent was 16 parts to 75 parts by weight.

Pigment agglomeration was effectively inhibited by the amino-type compounds. However, coatings made from the finished lacquer tended to have reduced resistance to water and humidity.

I do not wish my invention to be limited to the specific compositions described above, since modifications are readily apparent. Methods of fluxing the resinous composition other than grinding it on a differential roll mill will also be apparent to those skilled in the art.

I claim:

1. Process for producing a liquid coating composition of a vinyl resin and carbon black pigment, stabilized against agglomeration of the pigment particles, which comprises wetting the carbon black pigment with a solution of ammonia in an inert volatile organic liquid which is a non-solvent for the vinyl resin, grinding the wetted pigment with the vinyl resin, and dispersing the fluxed composition in a solvent for the vinyl resin.

2. Process for producing a liquid coating composition of a vinyl resin and carbon black pigment, stabilized against agglomeration of the pigment particles, which comprises wetting the carbon black pigment with a solution of ammonia in an inert volatile organic liquid which is a non-solvent for the vinyl resin, grinding the wetted pigment with the vinyl resin, and dispersing the fluxed composition in a solvent for the vinyl resin, said vinyl resin being substantially identical with that resulting from the conjoint polymerization of vinyl chloride with vinyl acetate.

3. Process for producing a liquid coating composition of a vinyl resin and carbon black pigment, stabilized against agglomeration of the pigment particles, which comprises wetting the carbon black pigment with a dilute solution of ammonia in methanol, grinding the wetted pigment with the vinyl resin, and dispersing the flexed composition in a solvent for the vinyl resin, said vinyl resin being substantially identical with that resulting from the conjoint polymerization of vinyl chloride with vinyl acetate.

CARL W. PATTON.